(12) United States Patent
Fieau et al.

(10) Patent No.: US 10,375,145 B2
(45) Date of Patent: Aug. 6, 2019

(54) COOPERATIVE NETWORK ARCHITECTURE

(71) Applicant: ORANGE, Paris (FR)

(72) Inventors: Frederic Fieau, Paris (FR); Gael Fromentoux, Pleumeur Bodou (FR); Nicolas Bihannic, Trebeurden (FR)

(73) Assignee: ORANGE, Paris (FR)

( * ) Notice: Subject to any disclaimer, the term of this patent is extended or adjusted under 35 U.S.C. 154(b) by 289 days.

(21) Appl. No.: 14/899,402

(22) PCT Filed: Jun. 23, 2014

(86) PCT No.: PCT/FR2014/051559
§ 371 (c)(1),
(2) Date: Dec. 17, 2015

(87) PCT Pub. No.: WO2014/207359
PCT Pub. Date: Dec. 31, 2014

(65) Prior Publication Data
US 2016/0149993 A1 May 26, 2016

(30) Foreign Application Priority Data

Jun. 25, 2013 (FR) ...................................... 13 56041

(51) Int. Cl.
*H04L 29/02* (2006.01)
*H04L 29/08* (2006.01)
*H04L 12/751* (2013.01)

(52) U.S. Cl.
CPC .............. *H04L 67/06* (2013.01); *H04L 45/02* (2013.01); *H04L 67/322* (2013.01)

(58) Field of Classification Search
CPC ..... H04L 67/327; H04L 47/10; H04L 67/101; H04L 45/021; H04L 67/18; H04L 67/125; H04W 4/02

(Continued)

(56) References Cited

U.S. PATENT DOCUMENTS

| 6,295,294 | B1 * | 9/2001 | Odlyzko | ................. H04L 12/14 370/234 |
| 9,668,083 | B2 * | 5/2017 | Xu | .......................... H04L 67/02 |

(Continued)

OTHER PUBLICATIONS

3rd Generation Partnership Project, "3rd Generation Partnership Project; Technical Specification Group Services and System Aspects; Policy and charging control architecture (Release 12)," 3GPP TS 23.203 v 12.0.0, <http://www.3gpp.org/ftp/tsg_sa/WG2_Arch/Latest_SA2_Specs/DRAFT_INTERIM/Archive/>, Feb. 12, 2013, 183 pages.

(Continued)

*Primary Examiner* — Adnan M Mirza
(74) *Attorney, Agent, or Firm* — Drinker Biddle & Reath LLP

(57) ABSTRACT

A method for transmitting information relating to a communication network, implemented by a first server of a communication network, the method comprising the following steps: storing a data table matching identifiers of subnetworks of the communication network associated with respective qualities of service, with at least one network address of a user terminal, the network address comprising an IP address of the user terminal; receiving a request from a second server of a service provider, the request requesting information linked to said communication network; transmitting at least a part of the data table to the second server, the part comprising the matches between each subnetwork identifier and the at least one network address of a user terminal.

14 Claims, 6 Drawing Sheets

(58) Field of Classification Search
USPC .......................................................... 709/218
See application file for complete search history.

(56) References Cited

U.S. PATENT DOCUMENTS

| 2005/0005023 A1* | 1/2005 | Dobbins | H04L 45/02 709/238 |
| 2011/0295942 A1* | 12/2011 | Raghunath | H04L 45/00 709/203 |
| 2014/0201184 A1* | 7/2014 | Seedorf | G06F 17/30864 707/706 |

OTHER PUBLICATIONS

3rd Generation Partnership Project, "3rd Generation Partnership Project; Technical Specification Group Core Network and Terminals; Policy and Charging Control over Rx reference point (Release 12)", 3GPP TS 29.214, v12.0.0, <http://www.3gpp.org/ftp/tsg_ct/WG3_interworking_ex-CN3/Draft_Specs_after CP60/>, Jun. 24, 2013, 57 pages.

\* cited by examiner

COOPERATIVE NETWORK ARCHITECTURE

CROSS-REFERENCE TO RELATED APPLICATIONS

This application is the U.S. national phase of the International Patent Application No. PCT/FR2014/051559 filed Jun. 23, 2014, which claims the benefit of French Application No. 13 56041 filed Jun. 25, 2013, the entire content of which is incorporated herein by reference.

BACKGROUND

The present invention relates to transmitting information in a telecommunication network, particularly in a mobile network.

It relates more specifically to the cooperation between service providers in the network and the operator in charge of the network.

The amount and volume of digital content accessible on IP-based ("Internet Protocol") mobile telecommunication networks are growing exponentially. To accommodate this growth, network operators are deploying organized and hierarchical architectures such as CDNs ("Content Delivery Networks") and supplemental functions such as PCC ("Policy and Charging Control"), which is described in the 3GPP standard "*Technical Specification Group Core Network and Terminals; Policy and Charging Control over Rx reference point*", TS 29.214, version 11.8.0 of Mar. 15, 2013.

Such hierarchical architectures allow enhancing the mobile network with associated services such as "Turbo Button" or "Data Booster". When customers are differentiated by quality of service, particularly a high quality "premium" service and a lower quality "non-premium" service, both services allow offering a "non-premium" customer a "premium" quality of service for a given service during a given period of time. A service is activated at the express request of the customer or when a service is requested that requires "premium" network service quality.

In an OTT ("Over The Top") type of architecture, a customer is both a customer of an OTT service provider and of the mobile network operator.

In the event that a CDN broker is inserted between the service provider and the network operator, the CDN broker is able to choose a resource delivery (CDN or server)/network pair, according to criteria based on the quality of the user experience.

In this case, the CDN broker can exclude a CDN/network pair when most user terminals of customers supplied by that network are returning unfavorable quality ratings for the CDN/network pair (network congestion for example). The ranking of the CDN/network pair is thus downgraded by the CDN broker, possibly to a level where it is no longer selectable for providing mobile customers with a service delivered in OTT mode.

A third-party service provider should be able to differentiate the quality of service it provides between different categories of network clients.

Network operators have no means of prioritizing a category of customers when the customers are using an OTT type of service. Indeed, for a service provided by a third-party service provider, and for which the quality of service is managed solely by a third-party service provider, the network operator can only guarantee its "premium" customers that they will not experience a degradation of quality of service, whether these customers are customers with a "premium" subscription or have activated a "Turbo Button" or "Data Booster" service for a given period. Thus, the desired categorization of mobile customers by the network operator has no effect on OTT services.

There is therefore a need to reinforce the cooperation between network operators and service providers, to enable effective categorization of users.

SUMMARY

The present invention improves the situation.

To this effect, it proposes a method for transmitting information relating to a communication network, implemented by a first server of a communication network, the method comprising the following steps:

storing a data table mapping identifiers of subnetworks of the communication network that are associated with respective qualities of service, to at least one network address of a user terminal, said network address comprising an IP address of the user terminal;

receiving a request from a second server of a service provider, said request requesting information concerning said communication network;

transmitting at least a portion of the data table to the second server, said portion comprising the mappings between each subnetwork identifier and said at least one network address of a user terminal.

As detailed below, the first server and the second server may communicate via the Rx interface defined in the 3GPP standard "*Technical Specification Group Core Network and Terminals; Policy and Charging Control over Rx reference point*", TS 29.214, version 11.8.0 of Mar. 15, 2013. The first server can then integrate the PCRF functionality defined in said standard, while the second server corresponds to the AF (Application Function, which is the generic term in 3GPP for service platforms). An example of a subnetwork identifier could be, for example, a PID as defined in the ALTO standard (see for example document U.S. 2011/0295983).

The method of the invention thus allows reinforcing the cooperation between mobile operator and service provider, and the service provider may be a third-party service provider, content provider, or CDN broker, as mentioned above. The method of the invention makes it possible to provide information to the service provider which ensures that the user categorization the network operator has put in place remains intact, without modifying the independence of the network resource management and policies put in place by the service providers. Reciprocally, the strengthening of such cooperation can allow the service provider to request a prioritization of service flows in the network according to a user categorization managed by the service provider.

According to one embodiment of the invention, the data table may further map a user identifier to the network address of a user terminal and to the identifier of the corresponding subnetwork.

This embodiment allows differentiating the different sessions of the same user, each session being identified by a network address.

In addition, each subnetwork identifier may be associated with a fixed range of network addresses of user terminals, the method further comprising the steps of:

receiving, from a user terminal identified to the first server by a first user identifier, a request to change the quality of service from a first quality of service to a second quality of service, upon receiving a session creation request from the user terminal, subsequent to receiving the request to change the quality of service, assigning to said user terminal a network address for the session, said network address being within the fixed range of network addresses that is associated with the identifier of the subnetwork associated with the second quality of service.

This embodiment has the advantage of using a data table which is fixed, which reduces the exchanges between service provider and network operator. After receiving a request to change the quality of service, which for example may follow the activation of a Data Booster or Turbo Button service, the next sessions will be assigned a network address corresponding to the newly requested quality of service. As the service provider has the data table portion, it can also handle such a session according to the second quality of service.

Alternatively, the user identifier can be shared by the first server and second server, the portion transmitted to the second server may comprise the mappings between each subnetwork identifier, each network address, and each user identifier, and the method may further comprise the following steps:

receiving, from the second server, a request to change the quality of service from a first quality of service to a second quality of service for a set of user terminals comprising at least one user terminal identified by a user identifier;

updating the data table to map each network address corresponding to the user identifier in the data table, to the subnetwork identifier associated with the second quality of service;

implementing a quality of service policy that is differentiated by network address, based on the membership of each network address in a subnetwork of the communication network, the membership being determined from the data table.

Thus, the invention allows enriching the Sponsored Data Connectivity standard by allowing a service provider to request a given categorization of users by the network operator, so that the network operator handles the sessions of these identified users according to the given categorization. In exchange, remuneration may be provided to the network operator, for example by sharing a cost table assigning a cost to each subnetwork.

According to one embodiment of the invention, the method further comprises:

upon receiving, from a first user terminal identified on the first server by a first user identifier, a request to change the quality of service from a first quality of service to a second quality of service, updating the data table to map each network address corresponding to said first user identifier in the data table, to the subnetwork identifier associated with the second quality of service; and transmitting at least a portion of the updated data table to the second server.

This embodiment allows the use of a dynamic data table which, although requiring frequent exchanges between the network operator and service provider, improves the flexibility of the method. Indeed, a dynamic data table allows moving the network addresses of current sessions to a subnetwork identifier associated with a second quality of service. Thus, when a user activates a service such as Turbo Button, all of his or her current sessions can be handled by the network operator and service provider as a premium quality of service.

In addition, the portion of the data table may be transmitted at a predetermined frequency to the second server, and the portion of the updated data table may be transmitted according to the predetermined frequency.

Such an embodiment reduces the exchanges between network operator and service provider, while keeping the dynamic data table regularly updated.

According to one embodiment of the invention, the method comprises a prior step of transmitting to the second server a mapping between each subnetwork identifier and each corresponding quality of service, for the purposes of providing a service to a user terminal according to a quality of service corresponding to the subnetwork mapped to the network address of the user terminal in the data table.

This allows enhanced cooperation between the network operator and service provider, which enables them to implement a common quality of service policy for the different subnetworks.

According to one embodiment of the invention, each network address may comprise an IP address and a port number.

By differentiating the network addresses by port numbers, the method allows differentiating users in the case of a network of users using NAT type addressing, for example.

According to one embodiment, a quality of service policy differentiated by network address is implemented in the communication network, and the method further comprises the steps of:

receiving a set of metrics from the second server, each metric in the set of metrics being indicative of a quality of experience in a subnetwork of the communication network;

updating, based on the received set of metrics, a quality of service policy by network address differentiated according to the membership of each network address in a subnetwork of the communication network, said membership being determined from the data table.

This embodiment enhances the "MOSAP" standard by allowing the service provider to provide sets of metrics concerning the quality of experience perceived by the different subnetworks. From this set of metrics, the network operator can prioritize specific flows, update the data table and notify the service provider of an updated data table, notify the service provider of prioritization of certain flows, and notify the service provider of application level prioritization that can be implemented by the service provider to ensure consistency in actions at the network level and application level for the various subnetworks.

A second aspect of the invention relates to a computer program comprising instructions for implementing the method according to the first aspect of the invention, when the program is executed by a processor.

A third aspect of the invention relates to a server intended for use in a communication network, the server comprising:

a storage unit for storing a data table that maps identifiers of subnetworks of the communication network associated with respective qualities of service, to at least one network address of a user terminal, the network address comprising an IP address of the user terminal;

a receiving unit for receiving a request, from a second server of a service provider, said request requesting information concerning said communication network;

a transmission unit for transmitting at least a portion of the data table to the second server, the portion comprising the mappings between each subnetwork identifier and the at least one network address of a user terminal.

A fourth aspect of the invention relates to a server intended to be used by a service provider to communicate with a server of a communication network, the server comprising:

- a transmission unit for transmitting a request to said network operator, said request requesting information concerning the communication network;
- a receiving unit for receiving at least a portion of a data table stored on the server of the network operator, the portion comprising mappings between identifiers of subnetworks of the communication network and at least one network address of a user terminal, the network address comprising an IP address of the user terminal;
- a storage unit for storing the portion of the data table.

According to one embodiment, the storage unit stores a table that maps subnetwork identifiers to respective qualities of service, the server of the service provider further comprising a unit for supplying a service to a user terminal according to a quality of service corresponding to the subnetwork mapped to the network address of the user terminal in the portion of the data table.

Additionally or alternatively, the server may further comprise a unit for determining a set of metrics, each metric being indicative of a quality of experience in a subnetwork of the communication network, and the transmission unit may be further adapted to transmit the determined set of metrics to the server of the network operator.

A fifth aspect of the invention relates to a system for cooperation between a service provider and a communication network, comprising a first server according to the third aspect of the invention and a second server according to the fourth aspect of the invention.

BRIEF DESCRIPTION OF THE DRAWINGS

Other features and advantages of the invention will become apparent from examining the following detailed description and the accompanying drawings in which.

DETAILED DESCRIPTION

Figure 1:
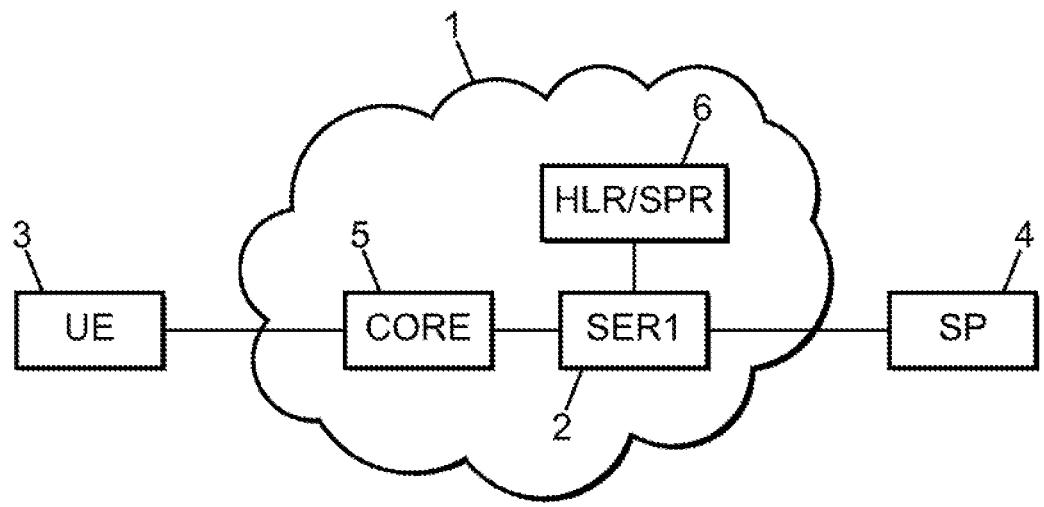
FIG. 1 illustrates a general architecture of a system for cooperation between a service provider and a network operator, according to one embodiment of the invention.

FIG. 1 illustrates a system for cooperation between a service provider and a network operator according to one embodiment of the invention.

A first server 2 of a network operator in charge of managing the network resources of a communication network 1 is able to communicate with a second server 4 of a service provider. No restrictions are placed on the type of network 1 considered. In the following, the invention is described in the context of an IP-based network 1 such as the Internet for example.

An interface between the first server 2 and the second server 4 may, for example, be the Rx interface defined in the 3GPP standard "*Technical Specification Group Core Network and Terminals; Policy and Charging Control over Rx reference point*", TS 29.214, version 11.8.0 of Mar. 15, 2013. The first server 2 then incorporates the PCRF functionalities defined in said standard, while the second server corresponds to the AF.

The first server 2 is also connected to the core network 5 and to a database of user profiles 6, such as the "User Profile Repository," HLR ("Home Location Register"), HSS ("Home Subscriber Server"), or SPR ("Subscription Profile Repository" of the PCC entity).

A user terminal 3 can request the services of the second server 4 via the network 1.

The present invention proposes integrating the principles of the ALTO standard ("Application Layer Traffic Optimization"), as defined in U.S. 2011/0295983, and in particular proposes the use of Network Maps or PID tables (also referred to more generally hereinafter as "data table"), which virtually partition the network 1 of the network operator into a set of virtual subnetworks each identified by a PID subnetwork identifier. According to the invention, a virtual subnetwork can be associated with a given quality of service, and thus can group users having access to such a quality of service in the eyes of the network operator. For example, a subnetwork can group all "premium" type users while another subnetwork can group all "non-premium" type users.

The present invention proposes sharing such PID tables between the network operator and service provider, which allows improving the quality of user experience according to the subnetwork to which they belong. With current techniques, a user can be "premium" for the network operator but not for the service provider. Conversely, another user can be "premium" for the service provider but not for the network operator.

According to the invention, depending on the context, the PID table can be constructed either from information coming from the network operator only ("premium" subscription of a user, temporary activation of a Turbo Button), or by considering information from the service provider (for example for a "Sponsored Data Connectivity" type of service as defined in the 3GPP standard "*Sponsored Data Connectivity—Stage 2 Architecture*", TS 23.203-c00, Mar. 5, 2013).

The invention may also provide the use of cost tables ("cost maps") as defined in the ALTO standard and which allow associating a network cost with each PID of the PID table. Cost maps can be defined by the network operator based on their experience, requirements, and context. In the example of the "Sponsored Data Connectivity" service, a cost map can be used by the network operator to specify an expected level of reimbursement for implementing the quality of service required by the service provider for the different virtual networks constituting the PID table.

For example, the costs associated with certain PIDs in the cost map may be increased when there is congestion in the subnetworks associated with these PIDs.

Thus, the invention allows the network operator to inform service providers about its virtual subnetworks and not its own mobile network (for example the topology information), which preserves the confidentiality of its network information.

In one embodiment of the invention, in case of limited cooperation between the service provider and the network operator, the privacy of the network operator customers can be preserved by providing neither the identity nor the profile of users (premium, non-premium), and thus the service provider does not know the identity of the users associated with each PID in the PID table.

Note that the network 1 can be optimally sized according to the number of premium users that it can allow, so as to ensure a quality of experience for the users. Such sizing can be carried out beforehand by the network operator and can be revised if necessary.

Thus, depending on the level of cooperation between the service provider and the network operator, at least a portion of said PID table is transmitted from the network operator to the service provider, upon receipt of a request from the service provider, said request requesting information concerning the network 1.

The PID table is a data table that maps identifiers (PID) of subnetworks of the communication network that are associated with respective qualities of service (premium or non-premium quality of service for example), to at least one network address of a user terminal, the network address comprising an IP address of the user terminal or even the allocated port. The PID table may further include an additional column dedicated to user identifiers, which can for example be MSISDN identifiers (telephone numbers). Thus, a user identifier can be associated with multiple network addresses, as a user may have multiple simultaneous communication sessions.

The portion of the data table transmitted to the service operator depends on the level of cooperation, but it includes at least the mapping between each subnetwork identifier and the network addresses of the user terminals.

The network addresses may further include a user terminal port number corresponding to a communication session, which is particularly advantageous in a context where network address translation (NAT) is used, as is the case in enterprise networks for example.

The present invention thus allows supplementing the PID definition given in the ALTO standard. In the current ALTO standard, the PID is only identified by a range of IP addresses reserved for each subnetwork, which does not allow differentiating between users of these subnetworks. By adding a range of ports (source or destination), the second server 4 of the service provider or broker can more accurately identify the PID of a user session by the IP address and source port of the packets sent by the user terminal 3.

It thus becomes possible to differentiate groups of users using the PID table (a range of ports per user group), particularly "premium" users versus "non-premium" users, without necessarily providing any information about the characteristics of the network 1 used by these user groups. The network operator can thus maintain a certain confidentiality with an OTT service provider that receives the PID table.

However, the addition of such a port range is optional when implementing the invention. Indeed, in systems not implementing NAT rules, a user terminal 3 can be identified by its IP address alone. In a general embodiment of the invention it is sufficient to transmit, to the second server 2 of the service provider, a mapping between PID-type subnetwork identifiers and network addresses comprising only an IP address. However, in a context where the user may have several service sessions open simultaneously, identification of each session at the network level is simplified by inclusion of the IP address and port used to define the network address.

In a context of weak cooperation between the service provider and network operator, the act of communicating only a mapping between PID and network addresses allows the network operator to withhold the categorization of its users from the service provider, transmitting only a partition table for its network which identifies virtual subnetworks.

However, as previously described, in a context of stronger cooperation, the portion of the PID table transmitted to the service provider may include a set of user identifiers. For example, in a mobile network, a PID may further correspond to a set of MSISDNs, enabling the service provider (content provider or broker) to identify the mobile users accessing its service with the corresponding PID. An MSISDN uniquely identifies a SIM card in a user terminal. Other user identifiers may be provided according to the invention, depending on the preference of the service provider, for example such as the use of aliasing or OpenID identifiers which is widely used by web parties.

Thus, in a context of greater cooperation (such as in a "Sponsored Data Connectivity" context), the service provider may indicate to the mobile operator the list of users who can benefit from this access to the sponsored service, so that these users are categorized into the corresponding subnetwork in the PID table of the network operator.

The present invention presents two examples of data tables.

In a first example, the data table is static, which means that when a user requests a "Turbo Button" service in order to be temporarily categorized as a "premium" user, only the sessions activated after activating the "Turbo Button" enjoy the "premium" status of the user. Thus, after activating the "Turbo Button" and creating a communication session, the terminal 3 of the user is assigned a network address (IP address possibly supplemented with a port number, depending on the embodiment) which is within the range of network addresses associated with the premium PID.

In table 1 below, representing an example of a static data table according to an embodiment of the invention, a terminal sending packets with IP address 82.82.80.1 and a source port between 5000 and 6000 will considered "subscriber premium" and therefore has a PID of 1 assigned by the operator and communicated, via said Rx interface for example, to the service provider in response to the previously submitted request. By default, the PID table can be defined according to order of priority (for example, 1 for the "premium" service and 2 for the "non-premium" service). In this first example of a PID table, non-premium users (PID 2) will be identified by all remaining IP addresses and ports (having a network address other than 82.82.80.1: 5000-6000) not specified in the previous row or rows (in this case, the previous row being dedicated to premium users).

TABLE 1

Static PID table

| | | Weak cooperation | |
|---|---|---|---|
| Type of user | PID | Range of network addresses (IP + source port) | Strong cooperation User ids |
| Premium (subscriber) | 1 | 82.82.80.0/16: 5000-6000 | 13109976224 15390018506 28114598401 |
| Non-Premium | 2 | All other IP addresses: all ports (which excludes the "premium" network addresses: 82.82.80.0/16: 5000-6000) | n/a |

Once a non-premium user whose initial network address is 82.82.80.2/3000 activates the "Turbo Button", each new session opened after this activation will be assigned, by the network operator, IP address 82.82.80.0 and a port number within the 5000-6000 interval for the network address, and thus the user's new sessions will map to PID 1.

Similarly, flows having for example an MSISDN of 13109976224 for the user identifier in a header of an HTTP request, will have a PID of 1 and will be considered premium by the network operator.

In addition, the network operator can build a cost map from the PID table, assigning a PID-weighted cost, as shown in Table 2 below.

TABLE 2 first example of a cost map

| PID | Cost |
|-----|------|
| 1   | 20   |
| 2   | 100  |

The cost map is managed by the network operator and can be dynamic, because it indicates the cost of resources for each virtual subnetwork identified by a PID. The cost map may reflect the availability of resources and is not necessarily transmitted to the service provider: in fact, such a transmission requires a sufficient degree of cooperation between the network operator and each service provider.

The degree of cooperation also determines the portion of the PID table which is sent to the service provider.

In a context of weak cooperation, for privacy reasons the network operator may not send the mapping between PID subnetwork identifier and type of user (premium and non-premium). Only the mapping between the PID and the range of network addresses is needed by the service provider or broker.

In a context of advanced cooperation, the user identifiers and/or the association between PID and type of users can be exchanged ("MOSAP" instantiation described below).

In a second example, the PID table is dynamic and the mapping between the type of user, the PID, the network address, and the user identifiers is updated on a regular basis or upon request. For example, it may be updated upon receipt of a request to change a quality of service, from a first quality of service (non-premium, for example) to a second quality of service (premium for example) following activation of a Turbo button. Depending on the degree of cooperation between the service provider and the network operator, all or only some of the information from the updated PID table is transmitted to the service provider. In any event, the mapping between the PID identifiers and network addresses is transmitted.

Such a dynamic PID table is given below in tables 3 (before updating) and 4 (after updating). In Table 3, the users are differentiated by subscriber premium users (PID 1), on-demand premium users (PID 2), and non-premium users (PID 3).

Thus, if a non-premium user activates the Turbo button for current and future communication sessions, the invention proposes modifying the PID table of the network operator by adding the network addresses (IP address possibly supplemented with port number) to the PID 2 mappings of on-demand premium users. The user in question is then considered an on-demand premium user and enjoys improvements to the quality of service.

In the example shown in tables 3 and 4, assuming a user who is initially non-premium and who has a current session with the service provider server 4 where the user is requesting service from a broker, said session being associated with network address 82.82.80.1: 3001, the user is initially identified as non-premium and is associated with a PID 3 in Table 3 prior to updating.

If this user activates the Turbo button, the network address of the current session is added to the PID 2 mappings and removed from the PID 3 mappings (see Table 4 after updating). The PID table can then be updated by the network operator and at least a portion of the updated PID table is transmitted to the service providers, said portion comprising at least the associations between PID and network addresses. Transmission of the updated table portion may be carried out regularly, at a given frequency for example.

The invention may also provide that the MSISDN user identifiers 13109976224, 15399018506, and 28114598401 correspond to non-premium users (PID 3) before updating. After the Turbo button is activated by users identified by MSISDN 13109976224 and 28114598401, and the PID table is updated (Table 4), the two MSISDN user identifiers 13109976224 and 28114598401 are mapped to subnetwork identifier PID 2 and correspond to on-demand premium users.

Note that in the example shown in tables 3 and 4, the user identified by MSISDN 28114598401 has two current sessions on two different ports (3001 and 4244) at the same IP address (82.82.80.3).

TABLE 3

Dynamic PID table, before updating

| Type of user | PID | Network addresses | User ids (MSISDN for example) |
|---|---|---|---|
| Premium (subscriber) | 1 | 82.83.80.0/16: 0-all<br>82.82.80.0/16: 5000-6000 | n/a |
| Premium (on-demand) | 2 | 82.82.80.1: 4244 | n/a |
| Non-Premium | 3 | All IP addresses: all port numbers (which excludes subscriber and on-demand premium network addresses, respectively: 82.83.80.0/16: 0-all, 82.82.80.0/16: 5000-6000 and 82.82.80.1: 4244) | n/a |

TABLE 4

Dynamic PID table, after updating

| Type of user | PID | Network addresses | User ids (MSISDN for example) |
|---|---|---|---|
| Premium (subscriber) | 1 | 82.83.80.0/16: 0-all<br>82.82.80.0/16: 5000-6000 | n/a |
| Premium (on-demand) | 2 | 82.82.80.1: 3001<br>82.82.80.1: 4244<br>82.82.80.2: 3001<br>82.82.80.3: 3001<br>82.82.80.3: 4244 | n/a<br>n/a<br>15399018506<br>28114598401<br>28114598401 |
| Non-Premium | 3 | All IP addresses: all port numbers (which excludes subscriber and on-demand premium network addresses, respectively: 82.83.80.0/16: 0-all 82.83.80.0/16: 5000-6000 82.82.80.1: 3001 82.82.80.1: 4244 82.82.80.2: 3001 82.82.80.3: 3001 82.82.80.3: 4244) | n/a |

Identically to the first example with its static PID table, a cost map can be associated with the dynamic PID table, and the cost associated with each PID can be regularly evaluated by the network operator. The information in the cost map may or may not be sent to the service providers or broker depending on the degree of cooperation with the network operator.

Table 5 provides an example of a cost map associated with a dynamic PID table.

TABLE 5 second example of a cost map

| PID | Cost |
|---|---|
| 1 | 20 |
| 2 | 20 |
| 3 | 100 |

Note that for a static or dynamic PID table, the geographical location of the user can also be taken into account when creating a subnetwork, and thus a PID identifier can be associated with a paired location/type of user.

Figure 2:
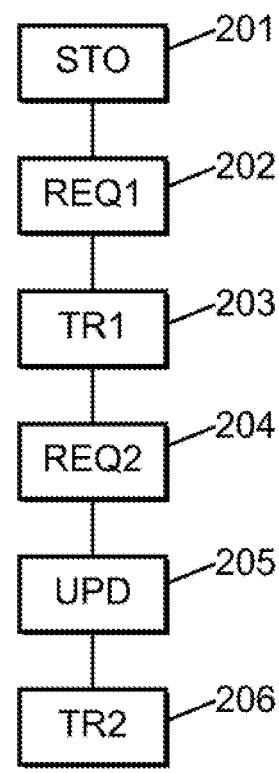
FIG. 2 is a diagram illustrating the steps of a method according to one general embodiment of the invention.

FIG. 2 is a diagram illustrating the steps of a method according to a general embodiment of the invention.

In a step 201, a data table, such as a PID table as defined above, is stored in the first server 2 of the network operator. The data table maps subnetwork identifiers, PID identifiers for example, of the communication network 1, to at least one network address of a user terminal 3, the network address comprising at least an IP address of the user terminal. The subnetwork identifiers correspond to respective qualities of service (subscriber premium, on-demand, or non-premium, for example). As previously described, the network address may further include a port number. In addition, the data table may map the subnetwork identifiers and network addresses to user identifiers. Such user identification may be initially shared between the first server 2 and the second server 4.

In a step 202, a request is received by the first server 2 from the second server 4, the request requesting information concerning the network 1 of which the network operator of the first server 2 is in charge.

In response to such a request, at least a portion of the data table may be transmitted by the first server 2 to the second server 4, in a step 203, said portion comprising at least the mapping between each subnetwork identifier and the network address of the user terminal. As detailed above, the transmitted portion of the data table depends on the degree of cooperation between the service provider and the network operator. Indeed, it may further include user types and user identifiers.

The method may possibly include a step 204 of receiving a request to change the quality of service for a user, from a first quality of service (for example non-premium) to a second quality of service (for example premium). Such a request may be received upon user activation of a Turbo button. The request is then received from the user terminal 3 via the core network 5. Alternatively, such a request may be sent by the second server 4 as part of a "Sponsored Data Connectivity" service. In this case, the request comprises an identifier of at least one user for whom the service provider is requesting that the PID of the user be updated in the data table by the network operator.

In a step 205, the data table is updated by the network operator, as explained above when the data table is dynamic. In the case of a static data table, only the mapping between the user identifier and the PID is updated (no change in the mapping to network addresses), but for future sessions the user is assigned network addresses associated with the PID of the second quality of service.

In a step 206, at least a portion of the accordingly updated data table may be transmitted to the service provider, which is only necessary in the case of a dynamic data table. The transmission may occur at a predetermined frequency of transmission of the data table portion.

Various practical implementations of the general method of FIG. 2 are now illustrated with reference to FIGS. 3 to 6.

Prior to the first step of each of these embodiments, an agreement between the service provider and the network operator may be established so as to allow the exchange of information between the first server 2 and the second server 4. Such an agreement may cover the characterization of virtual subnetworks via the PID concept introduced in the aforementioned ALTO standard. As for "Sponsored Data Connectivity" (FIGS. 4 and 6) and MOSAP (FIG. 5) applications, such an agreement may also cover the definition of quality of experience metrics characterizing each of the PIDs at time t.

Figure 3:
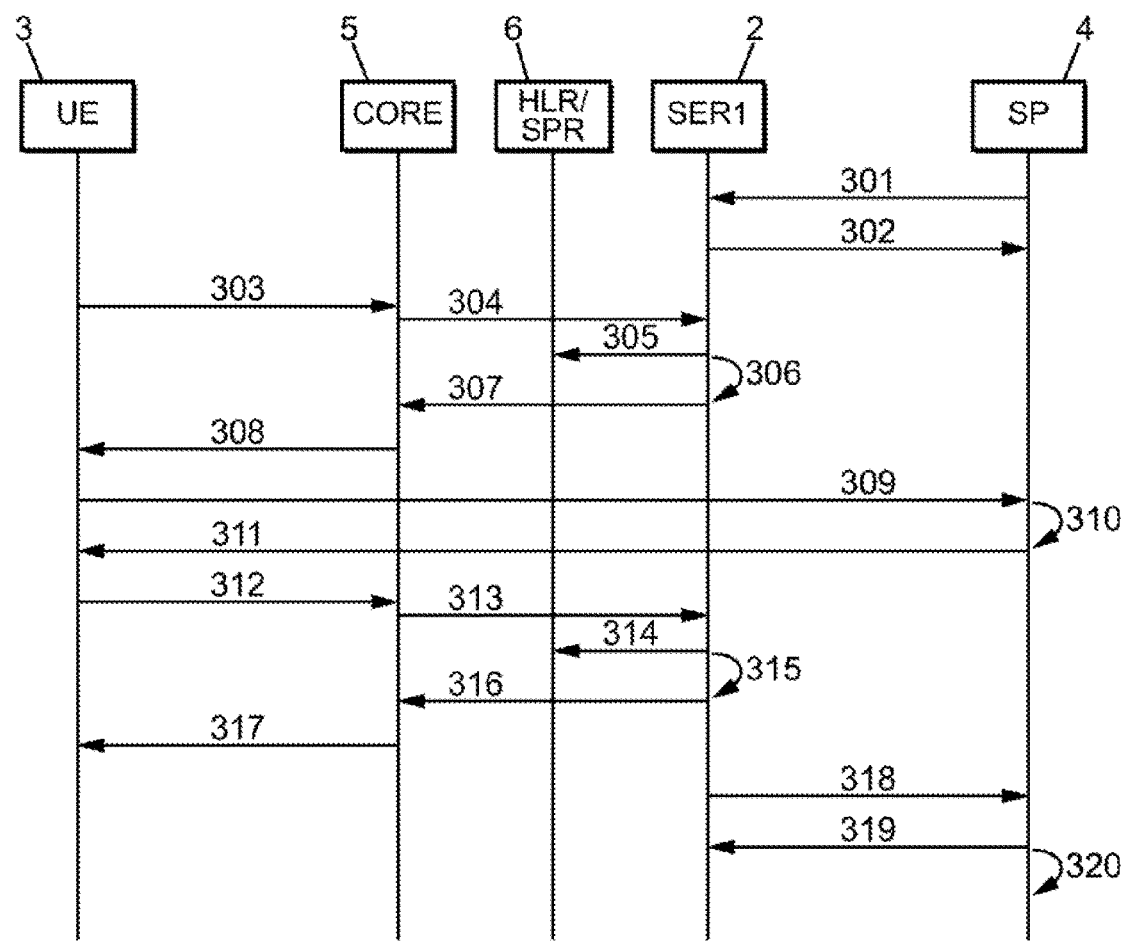
FIGS. 3 to 6 are diagrams illustrating flows between entities of the system of FIG. 1, according to four embodiments of the invention.

FIG. 3 is a diagram illustrating the steps of a method according to a first embodiment. According to this embodiment, a Turbo button is activated by a user with the network operator, and the service provider is notified of this.

The first server 2 initially stores a PID table that maps the PICs of virtual subnetworks to network addresses of user terminals.

In a step 301, the second server 4 of the service provider sends a request to the first server 2 of the service operator, requesting information concerning the network 1 of which the network operator is in charge.

In a step 302, in response to the request received, the first server 2 sends to the second server 4 at least a portion of the PID table it has stored. This portion comprises at least the mapping between the PID identifiers of virtual subnetworks and the network addresses of user terminals.

In a step 303, the user terminal 3 requests the creation of a session by allocation of a network address in the network 1, via the core network 5. The core network 5 then asks the first server 2, in a step 304, to allocate a virtual subnetwork PID for the session being created. To do so, the first server 2 requests information concerning the type of user of the terminal 3, from the database of user profiles 6, in a step 305. The type of user from the database of user profiles may correspond to a "premium" type subscription for example. The user may be considered "non-premium" by default.

In a step 306, based on the type of user (and possibly on the location of the user terminal 3), a PID identifier is associated with the user of the terminal 3, and a network address is assigned based on the allocated PID, the network address being determined using the PID table. The network address so determined is transmitted in a step 307 to the core network 5 for allocation to the user terminal 3 in a step 308.

In a step 309, the user terminal 3 sends a request for authentication and service to the second server 4, using the network address previously allocated to it. The service request also specifies the type of service required. The second server 4, upon receiving the request for authentication and service, looks in the portion of the PID table received in step 2, to determine a PID identifier for the network address from which the request came, in a step 310.

From the determined PID, and with consideration of prior agreements between the service provider and the network operator, the second server 4 provides a service to the user terminal 3 according to a quality of service that corresponds to the subnetwork identified by the determined PID. Thus, if the user is a premium subscriber for the network operator, the service provider will implement a premium service for the user, allowing implementation of a quality of service policy differentiated by subnetwork, which is common to the service provider and the network operator.

For example, in the following steps the user of the user terminal 3 is considered to be a non-premium type of user. Therefore, he is associated with a PID corresponding to non-premium users and receives a non-premium service for the service in step 311.

In a step 312, the user activates a Turbo Button service which causes the sending of a request to change the quality of service from a first quality of service (non-premium) to a second quality of service (on-demand premium). Upon receipt by the core network 5 of the request to change the quality of service, the request is transferred to the first server 1 for reallocation of a PID to the user of the terminal 3.

In a step 314, the first server carries out an optional step of verifying, in the database of user profiles 6, the user's eligibility for the Turbo Button service.

In a step 315, if the user is eligible for the Turbo Button service, a new PID identifier is assigned to the user based on the network location (optional) and based on the second quality of service requested. The PID table is then updated (if a dynamic PID table) by associating the network addresses of the current sessions of the user who requested the change of service, with the PID identifier corresponding to the second quality of service.

The update is transmitted to the core network 5 in a step 316, and a quality of service change confirmation may be sent to the user terminal in a step 317.

In a step 318, a portion of the updated PID table is transmitted to the second server 4 of the service provider. The portion of the updated PID table includes at least the updated mapping between the network addresses of the user which concern the service provider (other network addresses may be associated with other services) and the PID for the newly assigned quality of service (second quality of service).

In a step 319, the second server 4 can confirm receipt of the updated PID table.

In a step 320, the second server 4 processes the user's current sessions according to the second quality of service (premium) in accordance with the updated portion of the PID table received.

Note that in the case of a static PID table, the PID table is updated by simply changing the association between user identifier and PID identifier: the network addresses of current sessions are not associated with the PID of the second quality of service, only future sessions will be assigned a PID identifier corresponding to the second quality of service.

Figure 4:
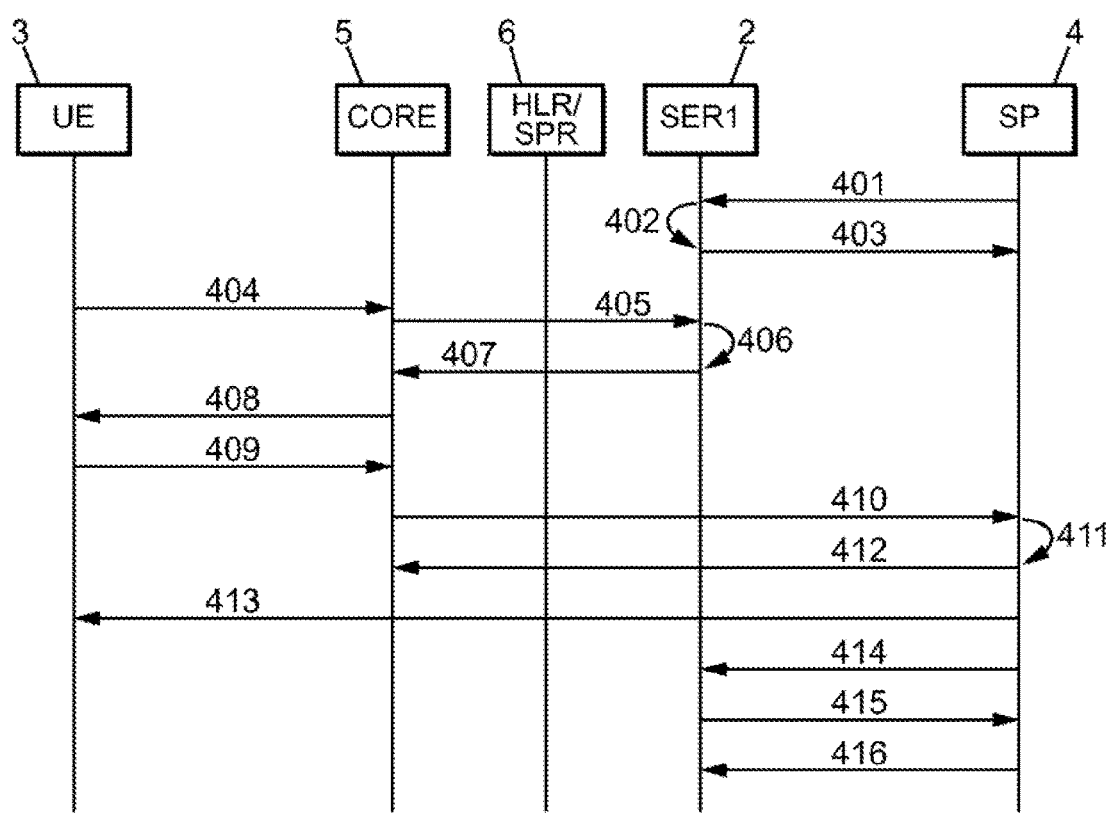

FIG. 4 is a diagram illustrating the steps of a method according to a second embodiment of the invention.

According to the second embodiment, the network operator is compensated for implementing a quality of service requested by the service provider (in a "Sponsored Data Connectivity" context).

Beforehand, user credentials are shared between the service provider and the network operator. These may be MSISDN identifiers, as described above. The service provider and network operator may reach an agreement concerning the conditions for allocating the different PIDs (user identity, lists of sponsored services, eligible location, eligible timeframe, etc).

In a step 401, the second server 4 sends a request to the first server, the request including a list of users (identified by their MSISDNs for example) having a premium option with the service provider. The identifiers of non-premium users are not necessarily provided to the first server 2 of the network operator. Such a request can be seen as a request to change the quality of service from a first quality of service (non-premium) to a second quality of service (premium), coming from the second server 4 of the service provider. In the current example, only the user identifiers mapping to the PID of the premium subnetwork (or subnetworks) are listed in the PID table stored on the first server 2.

Note that multiple PIDs can be negotiated between the service provider and the operator for the different premium options in the service provider's catalog. Users who are non-premium with the service provider can be grouped in a "nonSDC (Sponsored Data Connectivity)" PID while premium users (with the service provider) are grouped in the "SDC" PID.

The first server 2 then updates the PID table in a step 402, by associating the user identifiers received in the request, with the "SDC" PID.

A portion of the updated table is returned to the second server 4, in a step 403, possibly with a cost map that associates costs with the "SDC" and "nonSDC" PIDs (for compensation, as detailed below). The portion of the updated PID table includes at least the network addresses for the current sessions of users identified by the user identifiers, and the PID identifiers (dynamic PID table). In the case of a fixed PID table, the transmitted portion comprises the ranges of network addresses, mapped to the PIDs and the user identifiers.

In a step 404, the user terminal requests the creation of a session by allocation of a network address in the network 1, via the core network 5. The core network 5 then asks the first server 2, in a step 405, to allocate a virtual subnetwork PID for the session being created. To do so, the first server consults the PID table updated after step 402, and determines the PID corresponding to the user identifier present in the session creation request, in a step 406. A network address is then assigned to the user terminal 3, during step 406, according to the mapping between network addresses and PID identifiers in the PID table. In the case of a fixed PID table, the assigned network address is within the range of network addresses mapped to the PID identifier assigned to the user. In the case of a dynamic PID table, the assigned network address is entered in the PID table as mapping to the user identifier of the user of the terminal 3, and to the assigned PID. A portion of the PID table updated in this manner can then be transmitted, periodically for example, to the second server 4 for updating on the second server 4.

In addition, in step 406, the first server 2 creates network connection data (user identity, location, time, etc.) in order to use these data to confirm any PID reallocation request by the service provider. The operator will thus ensure that the context meets the conditions previously negotiated with the service provider.

In the example shown in FIG. 4, the user who made the network connection request is considered as being one of the premium users with the service provider, identified by the service provider in step 401. Therefore, the "SDC" PID is assigned.

The assigned network address and the assigned PID are then transmitted in a step 407 to the core network 5, which transmits the assigned network address to the user terminal 3 in a step 408.

In a step 409, the user terminal 3 requests a service from the second server 4, using the network address that was assigned. The service request travels via the network 1. The service request also specifies the type of service required. Optionally, the core network 5 may insert the user identifier into the service request, then transfer the resulting modified request to the second server in a step 410.

In a step 411, the second server 4 verifies that the user terminal has a network address associated with a "SDC" PID. In the present example, the network address of the user terminal 3 is indeed associated with a premium quality of service for the service provider, and therefore the second server 4 sends to the first server 2, in a step 412, a confirmation that a "SDC" quality of service is to be implemented for the user terminal 3.

In a step 413, a premium service is provided by the second server 4 to the user terminal. As this service also travels via the network 1, the network operator implements a premium "SDC" service for that user.

The service session ends in step 414, after which the second server 4 may send to the first server 2 the following information:
  user identifier for the user whose session has just ended (this ID being shared by the service provider and the network operator as explained above);
  PID identifier corresponding to the user ID;
  identity of the service provider;
  identity of the sponsor.

The first two pieces of information are not exchanged in the current "Sponsored Data Connectivity" standard and constitute new AVPs ("Attribute Value Pair").

From this information, and in a step 415, the first server 2 can generate a reimbursement request and transmit it to the second server 4, based for example on the duration of the session, the type of sponsored service, and the cost associated in a cost map with the PID assigned to the user terminal 3. In a step 320, the second server 4 may send a confirmation of receipt of the compensation request to the first server 2.

The "Sponsored Data Connectivity" standard is thus enhanced according to the invention, and adds a unit relating to the quality of service, to the factors determining the rate of reimbursement of the network operator. The current standard only considers the amount of transmitted data in the reimbursement, not the quality of service.

Figure 5:
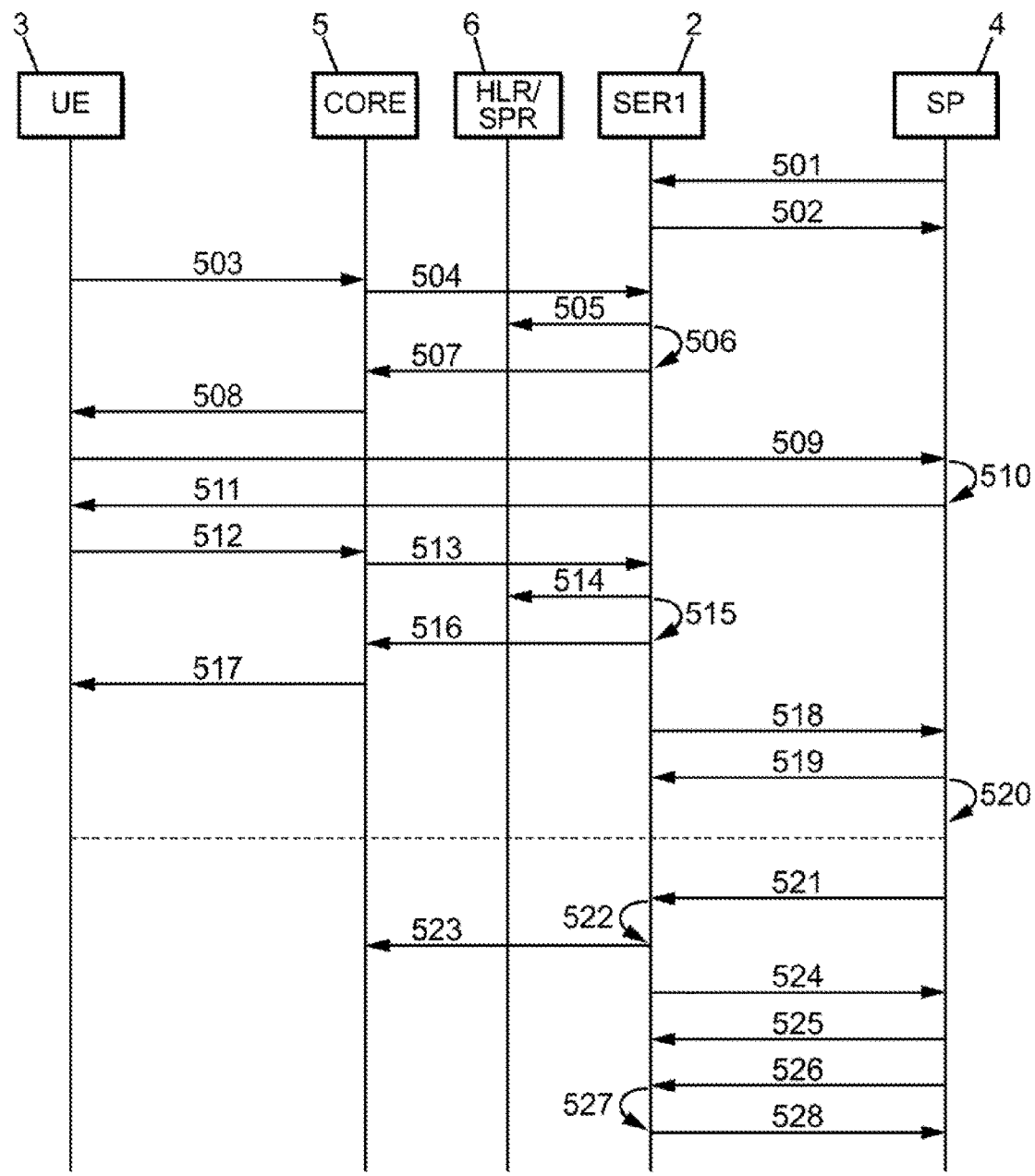

FIG. 5 is a diagram illustrating the steps of a method according to a third embodiment of the invention.

According to the third embodiment, an improvement to the MOSAP concept of cooperation between service provider and network operator is proposed. The service provider provides quality of experience information for each virtual subnetwork (and therefore for each user category) associated with a given PID.

Steps 501 to 520 are similar in all respects to steps 301 to 320 described with reference to FIG. 3.

In addition, the service provider is able to send quality of experience measurements to the first server 2.

To this end, the second server 4 is adapted to determine a set of metrics, each metric in the set of metrics being indicative of a quality of experience associated with a given PID. To this end, the quality of experience of users associated with the same PID are compiled to determine a metric associated with that PID.

The set of metrics is transmitted in a step 521 to the first server 2.

Based on the set of metrics received, the second server analyzes the metrics and determines an update to a quality of service policy differentiated by PID, in a step 522.

The update to the quality of service policy is transmitted to the core network 5 in a step 523 in order to be implemented. Thus, a quality of service policy is implemented in a differentiated manner for each user terminal network address, according to whether that network address is a member of one of the virtual subnetworks associated with a given quality of service.

In a step 524, the first server 2 transmits a notification to the second server 4, the notification identifying the flows of a PID that can be modified by the service provider at the application level, PID flows that were prioritized or not prioritized, or updates to the PID table.

In a step 525, the second server may confirm receipt of the notification received in step 524.

In a step 526, the second server 4 may send a new set of metrics per PID to the first server.

The first server 2 may analyze this new set of metrics and decide that no modification of the quality of service policy is to be implemented, in a step 527. For example, no change in the quality of service will be required if the metrics, received in step 526, are consistent with the expected quality of service. The first server 2 may then confirm receipt of the new set of metrics in a step 528.

Thus, the present invention allows enhancing the MOSAP standard:
  by enabling the service provider to provide sets of quality of experience metrics as perceived by each subnetwork of users (step 521);
  by enabling the network operator to prioritize flows upon receipt of sets of metrics (steps 522 and 523);
  by enabling the network operator to notify the provider that the PID table has been updated (step 524);
  by enabling the network operator to notify the service provider of the prioritization of flows in the network for each PID (step 524); and
  by enabling the network operator to notify the service provider of application level prioritization that can be implemented by the service provider to ensure consistent actions at the network and application levels for each PID (step 524).

Figure 6:
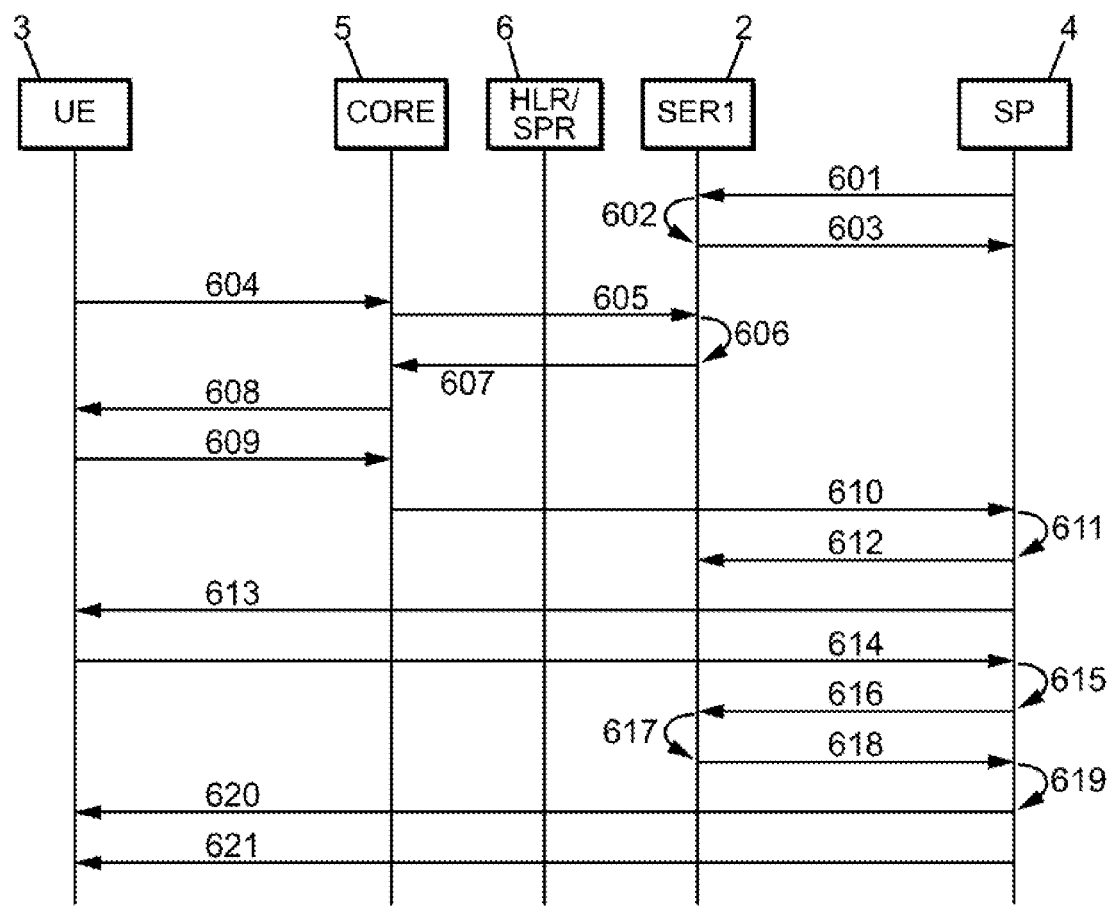

FIG. 6 is a diagram illustrating the steps of a method according to a fourth embodiment of the invention.

According to the fourth embodiment, an improvement in the "Sponsored Data Connectivity" standard is proposed. Unlike the example in FIG. 4, here the user requesting a network address assignment is considered as not being in the list sent by the service provider to the network operator, the list comprising user identifiers for which a premium quality of service is requested by the service provider. This improvement allows reallocation of a PID initially assigned to a user. This user is also considered to be non-premium from the point of view of the network operator (he or she has no premium subscription and has not activated the Turbo button with the network operator).

Beforehand, user identifiers are shared between the service provider and the network operator. These may be MSISDN identifiers, as previously described. The service provider and network operator may reach an agreement concerning the conditions for allocating the different PIDs (user identity, lists of sponsored services, eligible location, eligible timeframe, etc.).

In a step 601, the second server 4 sends a request to the first server, the request including a list of users (identified by their user identifier, such as the MSISDN for example) having a premium option with the service provider. The identifiers of non-premium users are not necessarily provided to the first server 2 of the network operator. Such a request can be seen as a request to change the quality of service from a first quality of service (non-premium) to a second quality of service (premium), coming from the second server 4 of the service provider. In the current example, only the user identifiers mapping to the PID of the premium subnetwork (or subnetworks) are listed in the PID table stored on the first server 2.

Note that multiple PIDs can be negotiated between the service provider and the operator for the different premium options in the service provider's catalog. Users who are non-premium with the service provider can be grouped in a "nonSDC" PID, while premium users (with the service provider) are grouped in the "SDC" PID.

The first server 2 then updates the PID table in a step 602, by associating the user identifiers received in the request, with the "SDC" PID.

A portion of the updated table is returned to the second server 4, in a step 603, possibly with a cost map that associates costs with the "SDC" and "nonSDC" PIDs (for compensation, as detailed below). The portion of the updated PID table includes at least the network addresses for the current sessions of users identified by the user identifiers, and the PID identifiers (dynamic PID table). In the case of a fixed PID table, the transmitted portion comprises the ranges of network address, mapped to the PIDs and the user identifiers.

In a step 604, the user terminal 3 requests the creation of a session by allocation of a network address in the network 1, via the core network 5. The core network then asks the first server 2, in a step 605, to allocate a virtual subnetwork PID for the session being created. To do so, the first server consults the PID table updated after step 602, and in the present example notes that the service provider has not requested the implementation of a premium service for this user. As a result, the first server 1 assigns a network address corresponding to the "nonSDC" PID categorization of the user by the network operator. As detailed above, in this example the user is also non-premium from the point of view of the network operator. A network address is then assigned to the user terminal 3, during step 606, said network address being associated with the PID of the non-premium subnetwork in the PID table. In the case of a fixed PID table, the assigned network address is within the network address range mapped to the PID of the non-premium subnetwork. In the case of a dynamic PID table, the assigned network address is entered in the PID table as mapping to the user identifier of the user of terminal 3, and to the PID of the non-premium subnetwork. A portion of the PID table updated in this manner can then be transmitted, periodically for example, to the second server 4 for updating on the second server 4.

In addition, in step 606, the first server 2 creates network connection data (user identity, location, time, etc.) in order to use these data to confirm any PID reallocation request by the service provider. The operator will thus ensure that the context meets the conditions previously negotiated with the service provider.

The assigned network address and the assigned PID are then transmitted in a step 607 to the core network 5, which transmits the assigned network address to the user terminal 3 in a step 608.

In a step 609, the user terminal 3 requests a service from the second server 4, using the network address that was assigned. The service request travels via the network 1. The service request also specifies the type of service requested. Optionally, the core network 5 may insert the user identifier into the service request, then transfer the resulting modified request to the second server in a step 610.

In a step 611, the second server 4 checks whether the user terminal has a network address associated with a "SDC" PID. In the present example, the network address of the user terminal 3 is associated with a non-premium quality of service for the service provider, and therefore the second server 4 sends to the first server 2, in a step 612, a confirmation that a "nonSDC" quality of service is to be implemented for the user terminal 3.

In a step 613, a non-premium service is provided by the second server 4 to the user terminal. As the service also travels via the network 1, the network operator implements a "nonSDC" quality of service for that user.

In a step 614, the user terminal 3 asks the second server 4 for a change in the quality of service in order to benefit from a premium quality of service. The request includes the network address of the user terminal 3 and may also include the type of service requested.

In a step 615, the second server 4 checks whether the user's subscription allows reallocating the PID to a premium quality of service.

If this check is confirmed, a request to change the quality of service is sent to the first server in a step 616, the request requesting a change in the quality of service from a first quality of service ("nonSDC" or non-premium in this example) to a second quality of service ("SDC" or premium in this example). Such a request also identifies the user by the MSISDN of the user of the terminal 3.

In a step 617, the first server 2 updates the PID table to associate the user identifier with the "SDC" PID. If the PID table is dynamic, all current session network addresses are also moved so that they map to the "SDC" PID in the PID table. In the case of a fixed PID table, only the future user sessions will have network addresses within the fixed range of network addresses associated with the "SDC" PID in the fixed PID table.

Confirmation of the update may be sent to the second server 4, possibly with a portion of the updated PID table, said portion comprising the association between the "SDC" PID and the user identifier of the user (and the network addresses of the user's sessions for a dynamic PID table).

In a step 619, the service provider then processes the current session of the user terminal 3 as premium, and a confirmation may be sent to the user terminal in a step 620.

The service is then delivered by the second server 4 to the user terminal 3 at a premium quality of service, in a step 621. This service is also premium from the point of view of the operator, and thus the invention allows implementation of a quality of service policy, differentiated by virtual subnetworks, which is common to the service provider and to the network operator.

Figure 7:
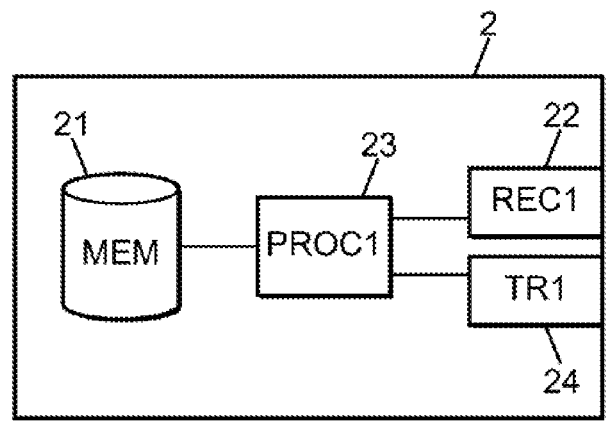
FIG. 7 illustrates a server of a network operator according to one embodiment of the invention.

FIG. 7 shows a first server 2 of a network operator according to one embodiment of the invention.

The first server 2 is able to communicate with a second server of a service provider, via the Rx interface defined in the 3GPP standard "*Technical Specification Group Core Network and Terminals; Policy and Charging Control over Rx reference point*", TS 29.214, version 11.8.0 of Mar. 15, 2013.

The first server 2 comprises a storage unit 21 for storing a data table (PID table) which maps the PID identifiers of subnetworks of the communication network that are associated with respective qualities of service (for example premium, non-premium), with at least one network address of a user terminal, the network address comprising at least an IP address of the user terminal.

The first server 2 further comprises a receiving unit 22 for receiving a request from a second server of a service provider, said request requesting information concerning the communication network. The request may be processed by a processing unit 23 adapted to determine a portion of the data table to be transmitted to the second server 4.

The first server 2 further comprises a transmission unit 24 for transmitting the portion of the data table to the second server 4, the portion comprising the mappings between each subnetwork identifier and the network address of the user terminal.

The first server 2 is further adapted to implement the steps that were previously attributed to it with reference to FIGS. 2 to 6.

Figure 8:
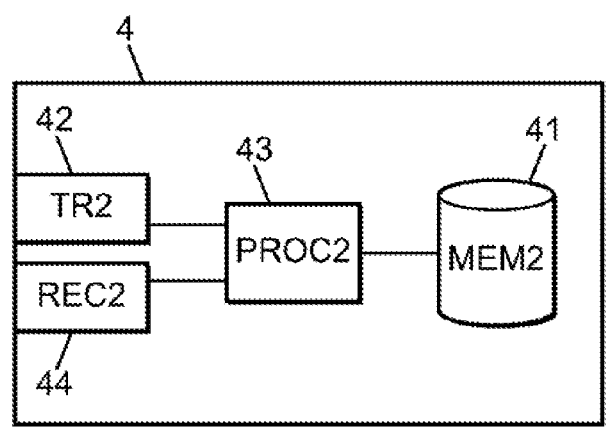
FIG. 8 illustrates a server of a service provider according to one embodiment of the invention.

FIG. 8 shows a second server 4 of a service provider according to one embodiment of the invention.

The second server 4 is adapted to communicate with a server of a network operator via the aforementioned Rx interface.

The second server 4 comprises a transmission unit 42 for transmitting a request to the first server 2, said request requesting information concerning the communication network. The second server 4 further comprises a receiving unit 44 for receiving at least a portion of a data table stored on the first server of the network operator 2, the portion including mappings between identifiers of subnetworks of the communication network and at least one network address of a user terminal, the network address comprising an IP address of the user terminal. The second server comprises a storage unit 41 for storing the portion of the data table.

The second server 4 further comprises a processing unit 43. According to one embodiment, the storage unit 41 stores a table that maps between subnetwork identifiers and respective qualities of service, and the processing unit 43 is a unit providing a service to a user terminal according to a quality of service corresponding to the subnetwork mapped to the network address of the user terminal in the portion of the data table. This embodiment thus allows implementing a quality of service policy which is common to the service provider and to the network operator.

According to another embodiment, the processing unit 43 is a unit for determining a set of metrics, each metric being indicative of a quality of experience in a subnetwork of the communication network, and the transmission unit 42 is further adapted to transmit the determined set of metrics to the first server 1 of the network operator. Such an embodiment makes it possible to implement the improvements to the MOSAP standard that were listed with reference to FIG. 5.

The second server 4 is further adapted to implement the steps that were previously attributed to it with reference to FIGS. 2 to 6.

Thus, the present invention makes it possible to enhance the manner of creating virtual subnetworks in a communication network, for example such as a mobile network. The current APN ("Access Point Name") configuration in a GGSN gateway connecting the mobile network and external IP networks may correspond to an implementation of virtual networks: an APN corresponds to a set of mobile data services. The use of a PID derived from the ALTO standard allows further enhancement to the construction of virtual subnetworks, with consideration of more criteria (quality of service or user location criterion).

In addition, consistency in categorization actions between network operator and service provider is enabled through the exchange of at least a portion of a PID table, and possibly cost maps.

The invention further allows considering the PID when assigning a network address to a user terminal.

In addition, a PID reallocation procedure is made possible by activation of Data Booster or Turbo Button type services, during which a procedure for verifying the PID connected to the user is implemented.

The PID table may include not only the IP address but also the port number, which allows differentiating current sessions having the same IP address (particularly useful in NAT-type addressing). In addition, the PID table may further comprise the user identifier of the terminal user (MSISDN identifier for example).

In addition, as detailed above, the invention allows enrichment of the "Sponsored Data Connectivity" standard or of MOSAP.

Of course, the invention is not limited to the embodiments described above by way of example, but can extend to other variants.

The invention claimed is:

1. A method for transmitting information relating to a communication network, implemented by a first server of a communication network, the method comprising the following steps:
   storing a data table mapping identifiers of subnetworks of the communication network that are associated with respective qualities of service, to at least one network address of a user terminal, said network address comprising an IP address of the user terminal;
   receiving a request from a second server of a service provider, said request requesting information concerning said communication network;
   transmitting at least a portion of the data table to said second server, said portion comprising the mappings between each subnetwork identifier and said at least one network address of a user terminal;
   receiving a session creation request from a user terminal;
   allocating an identifier of subnetwork for said session;
   assigning to the user terminal a network address for said session based on said allocated identifier of subnetwork; and
   implementing a quality of service policy that is differentiated by network address, based on the membership of each network address in a subnetwork of the communication network, said membership being determined from the data table,
   wherein the second server stores a table that maps subnetwork identifiers to respective qualities of service, the method further comprising supplying, by the second server a service to a user terminal according to a quality of service corresponding to the subnetwork mapped to the network address assigned to the user terminal for said session in the portion of the data table.

2. The method according to claim 1, wherein the data table further maps a user identifier to the network address of a user terminal and to the identifier of the corresponding subnetwork.

3. The method according to claim 2, wherein each subnetwork identifier is associated with a fixed range of network addresses of user terminals, said method further comprising the steps of:
   receiving, from a user terminal identified to the first server by a first user identifier, a request to change the quality of service from a first quality of service to a second quality of service,
   upon receiving a session creation request from the user terminal, subsequent to receiving the request to change the quality of service, assigning to said user terminal a network address for said session, said network address being within the fixed range of network addresses that is associated with the identifier of the subnetwork associated with the second quality of service.

4. The method according to claim 2, wherein said user identifier is shared by the first server and the second server, and wherein the portion transmitted to the second server comprises the mappings between each subnetwork identifier, each network address, and each user identifier, and wherein the method further comprises the following steps:
receiving, from the second server, a request to change the quality of service from a first quality of service to a second quality of service for a set of user terminals comprising at least one user terminal identified by a user identifier;
updating the data table to map each network address corresponding to said user identifier in the data table, to the subnetwork identifier associated with the second quality of service;
implementing a quality of service policy that is differentiated by network address, based on the membership of each network address in a subnetwork of the communication network, said membership being determined from the data table.

5. The method according to claim 2, further comprising:
upon receiving, from a first user terminal identified on the first server by a first user identifier, a request to change the quality of service from a first quality of service to a second quality of service, updating the data table to map each network address corresponding to said first user identifier in the data table, to the subnetwork identifier associated with the second quality of service; and
transmitting at least a portion of the updated data table to the second server.

6. The method according to claim 5, wherein said at least a portion of the data table is transmitted at a predetermined frequency to the second server, and wherein the portion of the updated data table is transmitted according to said predetermined frequency.

7. The method according to claim 1, comprising the second server a mapping between each subnetwork identifier and each corresponding quality of service, for the purposes of providing a service to a user terminal according to a quality of service corresponding to the subnetwork mapped to the network address of the user terminal in the data table.

8. The method according to claim 1, wherein each network address comprises an IP address and a port number.

9. The method according to claim 1, wherein a quality of service policy differentiated by network address is implemented in the communication network and wherein the method further comprises the steps of:
receiving a set of metrics from the second server, each metric in the set of metrics being indicative of a quality of experience in a subnetwork of the communication network;
updating, based on the received set of metrics, a quality of service policy by network address differentiated according to the membership of each network address in a subnetwork of the communication network, said membership being determined from the data table.

10. A non-transitory computer readable storage medium with a program stored thereon, said program comprising instructions for implementing the method according to claim 1, when this program is executed by a processor.

11. A server intended for use in a communication network, said server comprising:
a storage unit for storing a data table that maps identifiers of subnetworks of the communication network associated with respective qualities of service, to at least one network address of a user terminal, said network address comprising an IP address of the user terminal;
a receiving unit for receiving a request, from a second server of a service provider, said request requesting information concerning said communication network;
a transmission unit for transmitting at least a portion of the data table to said second server, said portion comprising the mappings between each subnetwork identifier and said at least network address of a user terminal so that the second server supplies a service to a user terminal according to a quality of service corresponding to the subnetwork mapped to the network address of the user terminal in the portion of the data table; and
a unit for implementing a quality of service policy that is differentiated by network address, based on the membership of each network address in a subnetwork of the communication network, said membership being determined from the data table,
wherein the server is adapted to implement receiving a session creation request from a user terminal, allocating an identifier of subnetwork for said session, and assigning to the user terminal a network address for said session based on said allocated identifier of subnetwork.

12. A server intended to be used by a service provider to communicate with a server of a communication network, said server comprising:
a transmission unit for transmitting a request to said server of the communication network, said request requesting information concerning said communication network;
a receiving unit for receiving at least a portion of a data table stored on the server of the communication network, said portion comprising mappings between identifiers of subnetworks of the communication network and at least one network address of a user terminal, said network address comprising an IP address of the user terminal; and
a storage unit for storing said portion of the data table,
wherein the storage unit stores a table that maps subnetwork identifiers to respective qualities of service, said server of the service provider further comprising a unit for supplying a service to a user terminal according to a quality of service corresponding to the subnetwork mapped to the network address assigned to the user terminal for a session in the portion of the data table.

13. The server according to claim 12, further comprising a unit for determining a set of metrics, each metric being indicative of a quality of experience in a subnetwork of the communication network, and wherein the transmission unit is further adapted to transmit the determined set of metrics to the server of the network operator.

14. A system for cooperation between a service provider and a communication network, comprising:
a server of the service provider, the server comprising
a storage unit for storing a data table that maps identifiers of subnetworks of the communication network associated with respective qualities of service, to at least one network address of a user terminal, said network address comprising an IP address of the user terminal;
a receiving unit for receiving a request, from a second server of a service provider, said request requesting information concerning said communication network;

a transmission unit for transmitting at least a portion of the data table to said second server, said portion comprising the mappings between each subnetwork identifier and said at least network address of a user terminal;
and the server of claim 11.

* * * * *